United States Patent
Jung et al.

(10) Patent No.: US 10,478,785 B2
(45) Date of Patent: Nov. 19, 2019

(54) ABRASION-PROOF FILTRATION MEMBRANE AND METHOD OF PRODUCING SAID MEMBRANE

(71) Applicant: MN BETEILIGUNGS GMBH, Grafenhausen (DE)

(72) Inventors: Gisela Jung, Wiesbaden (DE); Andreas Bareth, Wiesbaden (DE); Ulrich Meyer-Blumenroth, Idstein-Worsdorf (DE)

(73) Assignee: MN Beteiligungs GmbH, Wiesbaden (DE)

( * ) Notice: Subject to any disclaimer, the term of this patent is extended or adjusted under 35 U.S.C. 154(b) by 930 days.

(21) Appl. No.: 14/348,658

(22) PCT Filed: Oct. 2, 2012

(86) PCT No.: PCT/EP2012/004122
§ 371 (c)(1),
(2) Date: Mar. 31, 2014

(87) PCT Pub. No.: WO2013/050133
PCT Pub. Date: Apr. 11, 2013

(65) Prior Publication Data
US 2014/0284267 A1    Sep. 25, 2014

(30) Foreign Application Priority Data

Oct. 4, 2011  (DE) .......... 10 2011 114 634

(51) Int. Cl.
*B01D 69/02* (2006.01)
*B01D 71/62* (2006.01)
(Continued)

(52) U.S. Cl.
CPC ......... *B01D 71/62* (2013.01); *B01D 67/0013* (2013.01); *B01D 67/0016* (2013.01);
(Continued)

(58) Field of Classification Search
CPC .... B01D 71/62; B01D 71/68; B01D 67/0013; B01D 71/44; B01D 67/0016; B01D 69/02;
(Continued)

(56) References Cited

U.S. PATENT DOCUMENTS

2004/0084364 A1* 5/2004 Kools ............... B01D 67/0009
                                                       210/490
2008/0067127 A1  3/2008 Morikawa et al.
2010/0326915 A2* 12/2010 Fislage ............... B01D 61/027
                                                       210/646

FOREIGN PATENT DOCUMENTS

DE  102008021190 A1  11/2009
EP      2324906 A1   5/2011
GB      2199786 A    7/1988

* cited by examiner

*Primary Examiner* — Taiwo Oladapo
(74) *Attorney, Agent, or Firm* — ProPat, L.L.C.; Cathy Moore; Vinisha Joshi

(57) ABSTRACT

A filtration membrane (1) is provided that includes a porous support (4) and a membrane layer having a first and a second zone (2, 3). The first zone (2) has a thickness of 5 to 15 μm and an average pore opening size of smaller/equal 0.4 and the second zone (3) has a thickness of 5 to 40 μm and an average pore opening size of 0.5 to 5.0 μm. The filtration membrane (1) is produced by forming a single- or -double-layer coating on the porous support (4).

18 Claims, 6 Drawing Sheets

(51) Int. Cl.
*B01D 67/00* (2006.01)
*B01D 71/44* (2006.01)
*B01D 71/68* (2006.01)

(52) U.S. Cl.
CPC .............. *B01D 69/02* (2013.01); *B01D 71/44* (2013.01); *B01D 71/68* (2013.01); *B01D 2321/2091* (2013.01); *B01D 2325/02* (2013.01); *B01D 2325/04* (2013.01)

(58) Field of Classification Search
CPC ........ B01D 2325/04; B01D 2321/2091; B01D 2325/02
See application file for complete search history.

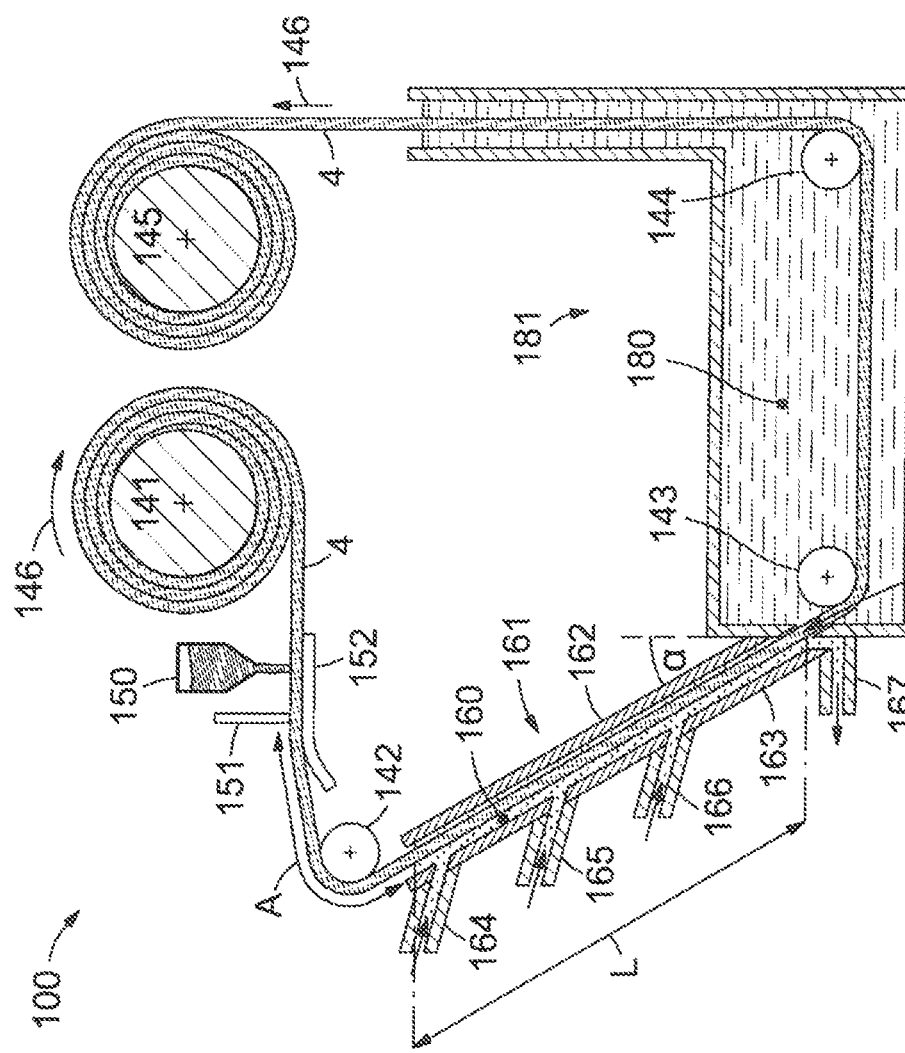

ABRASION-PROOF FILTRATION MEMBRANE AND METHOD OF PRODUCING SAID MEMBRANE

CROSS-REFERENCE TO RELATED APPLICATIONS

This application is being filed under 35 U.S.C. 371 as a National Stage Application of pending International Application No. PCT/EP2012/004122 filed Oct. 2, 2012, which claims priority to parent German Patent Application No. 10 2011 114634.6, filed Oct. 4, 2011. Both International Application No. PCT/EP2012/004122 and German Patent Application No. 10 2011 114634.6 are hereby incorporated by reference herein in their entirety.

FIELD OF THE INVENTION

The present invention concerns a filtration membrane comprising a porous support and a membrane layer with a first and second zone.

BACKGROUND OF THE INVENTION

In a number of industrial and municipal applications, such as wastewater treatment and desalination of sea water, membrane-based filtration processes, particularly crossflow filtration, have been used for decades. In the latter process, a liquid to be purified—also referred to as the feed—flows tangentially to the membrane surface over porous membranes in planar form. Depending on the application, the pore size of the membranes is in the range of a few nanometers to a few micrometers. The volume through which the feed flows, commonly referred to as the feed space, is separated by the membrane from a permeate space. A differential pressure of approximately 0.1 bar to 100 bar is applied between the feed space and the permeate space, which causes material to be transported from the feed space to the permeate space, causing permeate (or filtrate) to enter the permeate space. Membrane bioreactors (MBR) used in wastewater treatment are preferably operated with a pressure differential in the range of 0.02 to 0.4 bar.

In the MBR process, the wastewater is physically, chemically, and biologically treated in several steps until it reaches the filtration membrane. Particles, fibers, and coarse matter are removed from the wastewater by mechanical and physical pretreatment. In coarse filtration, large particles that could cause damage to the membranes are removed by grills and screens. Following this, fine screens in a size range of 0.05-3 mm are commonly used for prefiltration. Heavy particles (e.g., sand), oils, and fats are also removed from the wastewater by a sand and fat trap.

In a further treatment step, the wastewater is biologically and chemically treated. An activation tank contains sludge (biomass) with microorganisms that enzymatically convert and eliminate the high-molecular-weight organic contaminants. The residual materials following enzymatic conversion are used by the microorganisms either for cell building or energy production while consuming oxygen. The resulting oxygen consumption must be offset by a sufficient oxygen supply, for which purpose activating tanks are provided with aeration systems. The prerequisite for functioning of the process is that the biomass remain in the system. The biomass is therefore separated from the purified wastewater by membrane filtration and fed back to the activation tank. Built-up activated sludge is removed as surplus sludge. Before the biomass is separated from the water, further chemical treatments are carried out as needed. For this purpose, various precipitants and flocculants, such as iron chloride or polymers, are commonly used in combination with a filtration step in order to remove colloidal and particulate matter dissolved in the liquid.

The solid-free effluent is an essential advantage of MBR units. The effluent from an MBR unit contains no bacteria; even viruses are often separated out by sorption effects. This sharply reduces residual organic contamination. The MBR process is compliant with the hygienically relevant guideline values of the EU Bathing Water Directive [75/160/EEC, 2006]. Moreover, the solid-free effluent offers great potential for wastewater reuse in both the industrial and municipal sectors. This allows significant water conservation to be achieved using methods from water recycling to water circuit closure. Another advantage of the MBR process is that it requires far less space than the conventional activation process. The MBR modules replace secondary clarification, which in the conventional process is carried out in large secondary clarifiers in which the biomass precipitates. For this purpose, the MBR modules are submerged in the activation tank or used in separated filter chambers. In addition to obviating the need for secondary clarifiers, the footprint can be further reduced because the independence of the sedimentation process allows the activated sludge concentration (biomass concentration, expressed as DM—dry matter) to be increased compared to conventional processes. Membrane bioreactors are ordinarily operated with DM concentrations of 8 to 15 g/L, higher by a factor of 2-3 than conventional processes. The reactor volume in the MBR process can be reduced compared to conventional activation processes, making higher volumetric loading rates possible.

Filtration membranes are known from prior art. Some of the known filtration membranes are formed as a two-layer composite of a supporting nonwoven and a porous membrane layer. The porous membrane layer preferably consists of polyethersulfone, polysulfone, polyacrylonitrile, polyvinylidene fluoride, polyamide, polyetherimide, cellulose acetate, regenerated cellulose, polyolefins, or fluoropolymers. For example, the porous membrane layer may be produced, for example, by coating a nonwoven or fabric with polymer solution and precipitating the polymer in a subsequent phase inversion step. Alternatively, a polymer film may be stretched in a suitable manner so that pores are generated in the polymer film. The stretched polymer film is then laminated onto a supporting nonwoven for mechanical stabilization. Filtration membranes produced according to these methods are commercially available, e.g. under the name NADIR® membranes (MICRODYN-NADIR GmbH, Wiesbaden) or CELGARD® Flat Sheet Membranes (Celgard Inc., Charlotte, N.C., USA).

Components contained in the feed whose diameter is too large to pass through the membrane pores, are retained on the membrane surface, where some of them adhere. In crossflow filtration, feed permanently flows over the membrane surface in order to transport the retained components (retentate) away from the membrane surface. This makes continuous filtration operation with constant permeate flow possible. The crossflow mode of operation results in the typical structure of membrane modules, with three connections or passages for feed, retentate, and permeate. Membrane modules are equipped with a housing or frame which is open on one or more sides, and in which flat filter elements, or in rare cases, wound filters are mounted. Depending on the structure, in addition to passages between the filter elements or passages between the windings of the wound filter, a membrane module may optionally have connections for feed, retentate, and permeate arranged on the walls of the housing.

In a flat filter element, the permeate space is bounded by two separate membranes or two partial surfaces of a one-piece membrane. A porous permeate spacer is arranged between the two membranes or partial surfaces that on the one hand acts as a supporting structure for the sensitive membranes, which are subjected to a transmembrane differential pressure of up to 100 bar, and on the other provides passages through which the permeate flows off along the inner side of the membrane/partial surface. In a membrane module having several flat filter elements, the permeate space is composed of all of the permeate spaces of all flat filter elements.

In flat filter modules, a plurality of planar flat filter elements are arranged in parallel in a stack. Spacers are arranged between each two adjacent flat filter elements that keep a passage open through which the feed and retentate can flow in and out. The spacers comprise, for example, washers made of a polymeric material that are arranged between the peripheral areas or edges, and particularly the corners, of each two adjacent flat filter elements. Alternatively, a frame or housing equipped with equidistant grooves for holding the edges of the flat filter elements can be used.

Filtration membranes suitable for MBR have a cutoff of less than 400 nm and an operating permeability of more than 100 L/($m^2$·h≤bar), and preferably more than L/($m^2$·h·bar). The cutoff refers to the diameter of the smallest particles retained by the membrane. Because of surface layer formation during filtration, the effective cutoff is sharply lower, so that even most viruses in the area of 25 nm are retained.

According to a highly simplified model concept, a filtration membrane consists of a solid material penetrated by a plurality of cylindrical pores that are oriented perpendicularly to the surface of the filtration membrane, wherein all of the pores are of the same diameter. In this simple model, the cutoff corresponds to the diameter of the cylindrical pores. Real filtration membranes show a complex morphology, with irregular, three-dimensionally branched or spiral-shaped pores or passages. The pores of actual filtration membranes have an area of minimal diameter that determines the cutoff of the respective pore. In the ideal case, the area of the smallest pore diameter is at the surface of the filtration membrane, so that no particles with a diameter greater than the cutoff can penetrate the pores and plug them. In actual filtration membranes, the area of the minimum pore diameter is at a distance from the membrane surface that varies from pore to pore.

Filtration membranes used for the MBR process have a highly asymmetric structure with a finely porous separating layer 0.5 to 1.0 μm thick and a coarsely porous supporting layer 30 to 100 μm thick. The pore diameters of the separating layer are smaller than 0.1 μm. The finger-like pores of the supporting layer are often referred to in the art as caverns and have a diameter of up to 20 μm. The double-layer structure of these known filtration membranes ensures a cutoff in the range of 0.03 to 0.1 μm together with favorable clean water permeability from 200 to 1000 L/($m^2$·h·bar). These membranes are provided with a stabilizing agent in the production process. The stabilizing agent prevents the pores in the thin, finely porous separating layer from collapsing when the membrane dries. Collapse of the pores is caused by the enormous capillary forces generated when water evaporates from the small pores and is irreversible. After washing out the stabilizing agent, e.g. after the membranes are put into operation, they must not be dried, as this would cause an irreversible decrease in clean water permeability to less than 10 L/($m^2$·h·bar).

A problem in the use of membrane filters in the area of wastewater treatment is what is referred to as "membrane fouling", which is characterized by the formation of deposits on the membrane that reduce permeation and thus filtration performance to values of 50 to 200 L/($m^2$·h·bar).

Various methods are used to control fouling in the MBR process:

(a) Pretreatment of the untreated water or wastewater before it flows into the activated sludge by means of various filtration steps mentioned above, in which fine-mesh gratings having a mesh size of 0.5 to 3 mm are used;

(b) In the "cross-flow" process, the liquid to be purified is circulated along the membrane surface, and for this purpose, in the case of submerged modules, aeration devices that induce upward flow are installed below the membrane modules;

(c) Regular backwashing with permeate, so that adhering particles/contaminants are detached from the membrane surface and the pores are flushed open. A precondition is that it must be possible to backwash the respective membrane;

(d) Chemical cleaning, wherein the filtration membranes are taken out of service and additional membranes must be installed if necessary. The chemicals used in chemical cleaning, such as sodium hypochlorite NaOCl pollute the environment and form absorbable organic halogen compounds (AOX). In addition, chemical cleaning requires an additional infrastructure (pumps, chemical containers, leak detectors, protective equipment) which is costly. Often, the membranes are cleaned in a separate cleaning container having a small volume in order to reduce the amount of cleaning chemicals. For this purpose, the membrane module must be removed from the filtration tank and transferred to the cleaning container. Chemical cleaning involves considerable cost and adversely affects the environment.

(e) Addition of cleaning granules to the activated sludge, as described for example in the publication by the firm VA Tech Wabag GmbH, Vienna, author: F. Klegraf, entitled "Managing of Fouling and Scaling on Submerged Filtration Systems in Activated Sludge Membrane Units" and in patent application DE 10 2008 021 190 A1. In this case, granules having varying abrasive strengths are used, with said granules being entrained in the crossflow and along the surface of the membranes. Expanded clay and polymers are some of the materials that have been tried out as cleaning granules. The cleaning granules are retained by screens in the filter chambers of the MBR unit. The turbulence introduced into the MBR with the flushing air is sufficient to homogeneously distribute the cleaning granules. Shortly after the MBR unit is charged with cleaning granules, filtration performance increases, and by increasing the concentration of the cleaning granules in the activated sludge, filtration performance can after a certain period be regenerated to 75% of the starting value. Any further increase in the concentration of cleaning granules does not noticeably improve filtration performance. The use of cleaning granules is controversial, as the sensitive surfaces of the filtration membranes are damaged.

As the separation layer in known asymmetric filtration membranes is only 0.5 to 1.0 μm thick, they are extremely sensitive to the abrasive effect of cleaning granules. In abrasion experiments conducted to investigate this, massive damage and penetration of the separating layer was observed. The clean water permeability values of these membranes increase from 500-1000 L/(m²·h·bar) to 10.000-50.000 L/(m²·h·bar). The mean pore diameter of these membranes increases from 0.03-0.05 μm to 1-10 μm. If the separating layer breaks and the caverns of the coarsely-porous supporting layer are opened, there is a risk that activated sludge will penetrate into the membrane structure and clog large areas of the surface, sharply decreasing filtration performance. In the worst-case scenario, the MBR unit has to be shut down and fitted with new membrane modules.

In addition to the above-mentioned highly asymmetric filtration membranes with a thin separating layer followed by a separating layer with extremely coarse pores, separation membranes with a graded pore profile are known in the art. Such membranes are characterized by a cutoff in the range of 0.05 to 0.4 μm and favorable abrasion resistance to cleaning granules. These membranes can also be dried without using a stabilizing agent because of their larger pores and pore structure. However, such membranes have a low clean water permeability of less than 150 L/(m²·h·bar) and a correspondingly reduced operating permeability of 50 to 100 L/(m²·h·bar), making economical operation of an MBR impossible.

SUMMARY OF ADVANTAGEOUS EMBODIMENTS OF THE INVENTION

The object of the present invention is to provide a filtration membrane that shows economical filtration performance and permeability, is abrasion-resistant, and is suitable for the use of cleaning granules in the MBR process.

This object is achieved by means of a filtration membrane comprising a porous support and a membrane layer with a first and second zone, wherein the first zone has a thickness of 5 to 15 μm and a mean pore size (mean pore opening diameter) of less than or equal to 0.4 μm and the second zone has a thickness of 5 to 40 μm and a mean pore size (mean pore opening diameter) of 0.4 to 5.0 μm.

BRIEF DESCRIPTION OF THE FIGURES

FIG. 9 is a schematic illustration of an exemplary device for the production of inventive filtration membranes.

DETAILED DESCRIPTION OF ADVANTAGEOUS EMBODIMENTS OF THE INVENTION

Further embodiments of the filtration membrane according to the invention are characterized in that:

the first zone has a thickness of 8 to 12 μm;
the first zone has a mean pore size (mean pore opening diameter) of less than or equal to 0.3 μm;
the second zone has a thickness of 5 to 30 μm;
the second zone has a thickness of 10 to 20 μm;
the second zone has a mean pore size of 0.4 to 2.0 μm;
in the first zone, the mean pore size (mean pore opening diameter) increases with increasing distance from a surface of the filtration membrane;
in the first zone, the mean pore size (mean pore opening diameter) increases with a mean gradient of 20 to 80 nm per 1 μm distance from the surface of the filtration membrane;
in the second zone, the mean pore size (mean pore opening diameter) increases with increasing distance from a surface of the filtration membrane;
in the second zone, the mean pore size (mean pore opening diameter) increases with a mean gradient of 200 to 800 nm per 1 μm distance from the surface of the filtration membrane;
the filtration membrane has a mean pore diameter of 0.04 to 0.2 μm;
the filtration membrane has a mean pore diameter of 0.08 to 0.15 μm;
the filtration membrane has a clean water permeability of 200 to 3000 L/(m²·h·bar);
the filtration membrane has a clean water permeability of 300 to 2000 L/(m²·h·bar);
the filtration membrane has a clean water permeability of 500 to 1000 L/(m²·h·bar);
the filtration membrane, after an abrasion test lasting 450 h, has a clean water permeability of 500 to 3000 L/(m²·h·bar);
the filtration membrane, after an abrasion test lasting 450 h, has a clean water permeability of 800 to 1500 L/(m²·h·bar);
the filtration membrane, after an abrasion test lasting 450 h, has a mean pore diameter of 0.05 to 0.2 μm;
the filtration membrane, after an abrasion test lasting 450 h, has a mean pore diameter of 0.08 to 0.15 μm;
the first zone consists of polysulfone and polyvinylpyrrolidone;
the second zone consists of polysulfone and polyvinylpyrrolidone; and/or
the support is a textile nonwoven.

Essentially, the first and second zones of the membrane layer differ in mean pore size or mean pore diameter, which is determined by the production process. According to the invention, the membrane layer can also be produced by precipitation of a single-layer polymer solution so that the first zone has a seamless transition to the second zone.

Figure 4:
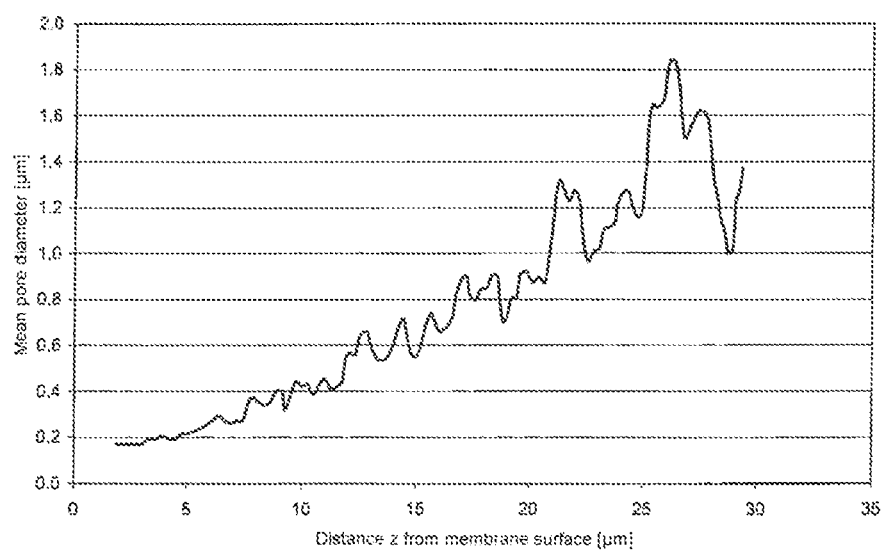
FIG. 4 is a graphical illustration of the mean pore diameter as a function of distance from the membrane surface for an exemplary inventive membrane.

In the context of the present invention, the term "mean gradient" refers to the slope of a regression line for the mean pore size (mean pore opening diameter) applied as a function of distance from the surface of the filtration membrane, as shown for example in FIG. 4.

The invention also concerns a filtration device that includes one or more filtration membranes of the type described above.

A further object of the present invention is to provide a process for the production of filtration membranes of the type described above.

This object is achieved by means of a first process comprising the following steps:

Preparation of a porous support in sheet form;

Optionally, coating of the support with a first polymer solution of one or more polymers and a first solvent, wherein the concentration of the polymer in the first solvent has a value C1;

Coating of the support with a second polymer solution of one or more polymers and a second solvent, wherein the concentration of the polymer in the second solvent has a value C2 that is larger than C1;

Application to the surface of the second polymer solution of a first vaporous precipitation bath; and Precipitation of the second and optionally the first polymer solution, wherein the support coated with the second and optionally the first polymer solution is fed through a second liquid precipitation bath.

Advantageous embodiments of the first process according to the invention are characterized in that:

the first and second solvent are identical;
the polymer or polymers of the first and second polymer solution have an identical chemical composition;
concentration C1 is in the range of 15-19%;
concentration C2 is in the range of 17-21%;
the polymers of the first and second polymer solution are the same or different and are selected from the group comprising polyethersulfone, polysulfone, polyvinylpyrrolidone, polyvinylidene fluoride, and mixtures thereof;
the first and second solvent are the same or different and are selected from N-methylpyrrolidone, N-ethylpyrrolidone, dimethylacetamide, dimethylformamide, acetone, or mixtures thereof;
the first precipitation bath is evaporated by heating or converted into an aerosol by means of a sputtering device; and/or
the first and second precipitation baths are the same or different and constitute water or a mixture of water with one or more solvents selected from the group comprising N-methylpyrrolidone, N-ethylpyrrolidone, dimethylacetamide, dimethylformamide, acetone, or mixtures thereof.

An alternative second process for the production of the filtration membrane according to the invention comprises the following steps:

Preparation of a porous support in sheet form;

Coating of the support with a polymer solution of one or more polymers and a first solvent; and Transport of the support with the polymer solution through a first precipitation bath composed of a first precipitant, a second solvent, and optionally additives, over a segment L measuring 0.4 to 2.0 m, wherein the concentration of the second solvent decreases over segment L from a starting value of 10 to 40 vol % to an end value of 0.5 to 5 vol %.

Advantageous embodiments of the second process according to the invention are characterized in that:

the support coated with the polymer solution is passed through a second precipitation bath, wherein the second precipitation bath consists of a second precipitant, optionally a third solvent, and optionally additives;
the first, second, and third solvent are identical;
the first and second precipitant are identical;
the polymers of the polymer solution are selected from the group comprising polyethersulfone, polysulfone, polyvinylpyrrolidone, polyvinylidene fluoride, and mixtures thereof;
the first, second, and third solvent are the same or different and are selected from N-methylpyrrolidone, N-ethylpyrrolidone, dimethylacetamide, dimethylformamide, acetone, or mixtures thereof;
the concentration of the polymers in the polymer solution is 15 to 21 wt. %;
the concentration of the first solvent in the first precipitation bath decreases over segment L with a gradient of 2.5 to 98.8 vol %·m$^{-1}$, preferably 10 to 98.8 vol %·m$^{-1}$, and more preferably 20 to 98.8 vol %·m$^{-1}$;
the support coated with the polymer solution is transported at a rate of 1 to 120 m/min, and preferably 4 to 30 m/min, through the first precipitation bath;
the first precipitant is water;
the concentration of the first precipitant in the first precipitation bath varies within a range of 60 to 99.5 vol %;
the second precipitant is water; and/or
the concentration of the second precipitant in the second precipitation bath is 80 to 99.9 vol %, preferably 90 to 99.5 vol %, and more preferably 95 to 99.5 vol %.

Figure 1:
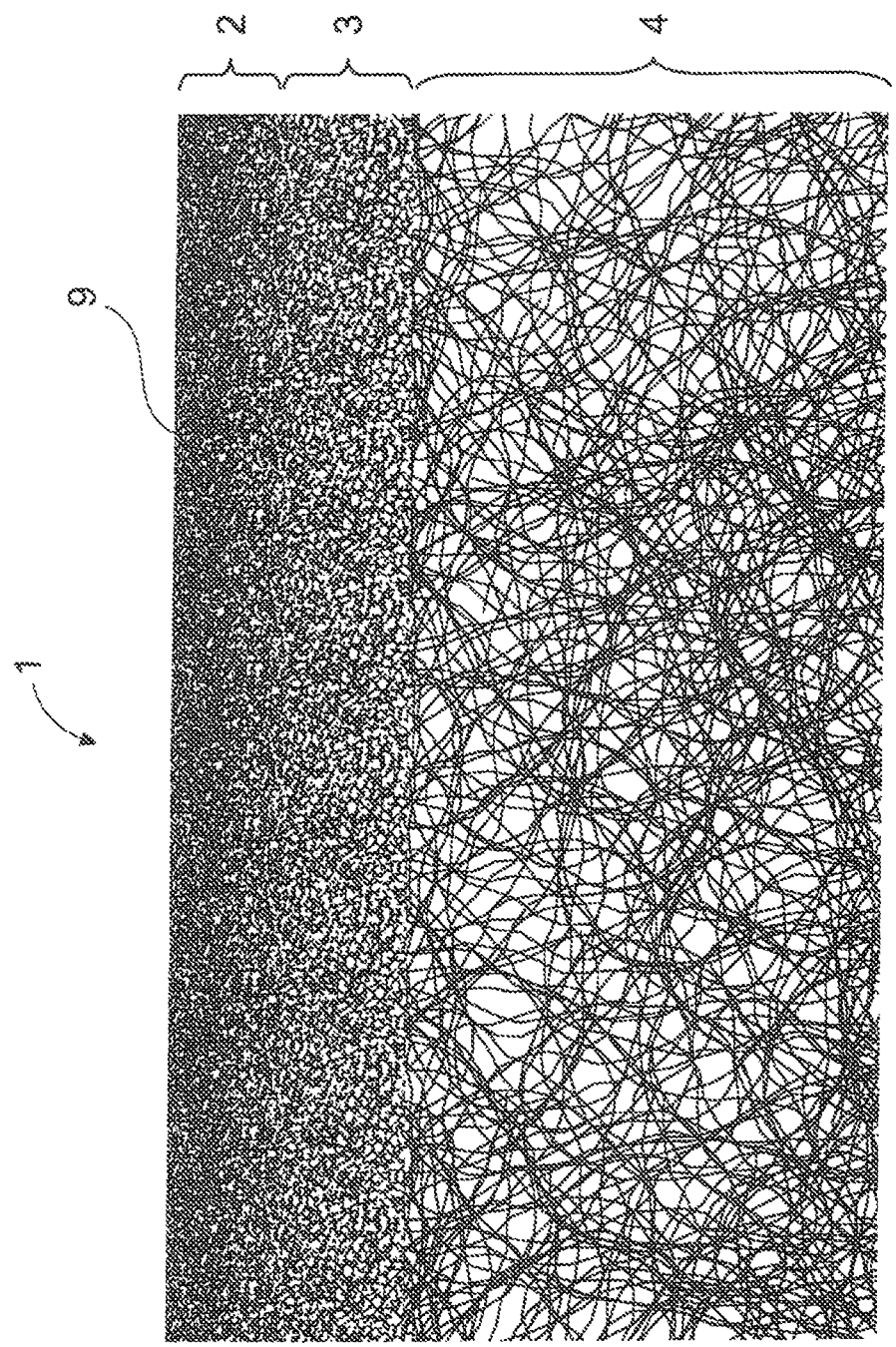
FIG. 1 is a schematic sectional view of an exemplary inventive membrane.
Figure 2:
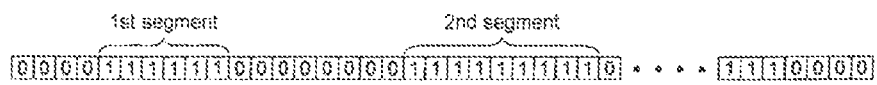
FIGS. 2 and 3 represent scan lines on an electron micrograph.
Figure 3:
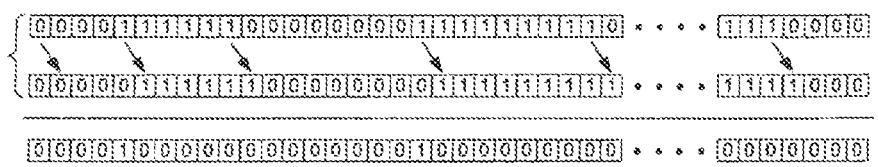
Figure 5:
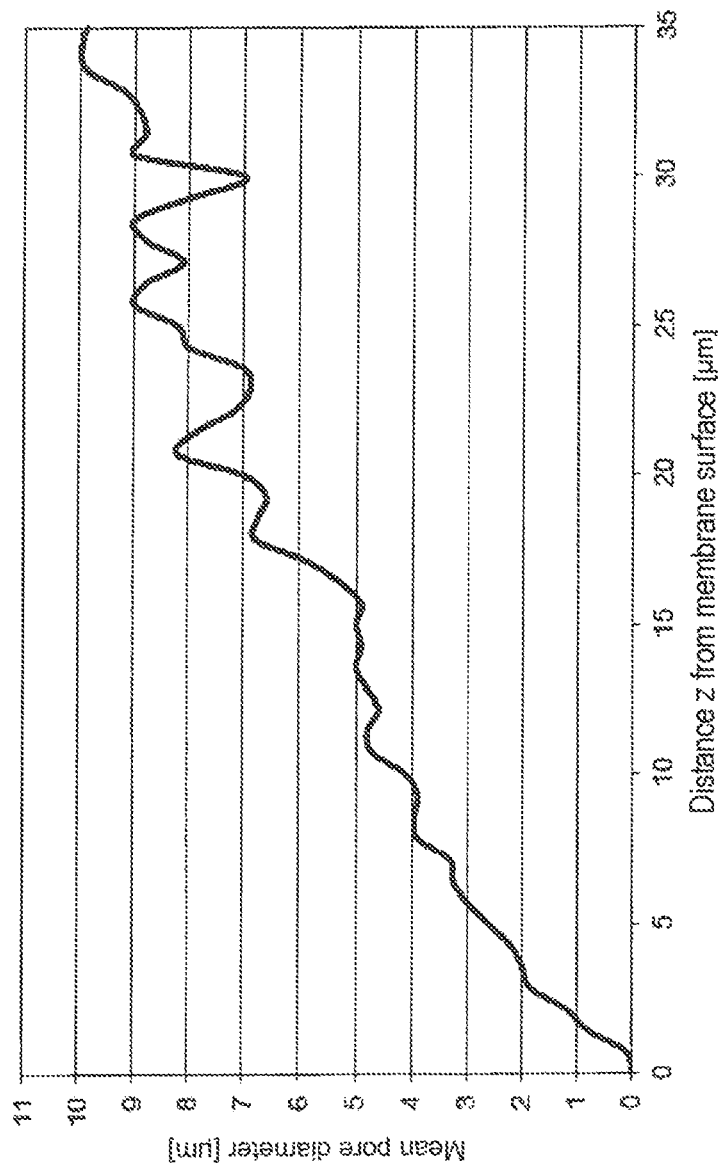
FIG. 5 is a graphical illustration of the mean pore size diameter versus distance from the membrane surface for a membrane of prior art.
Figure 6:
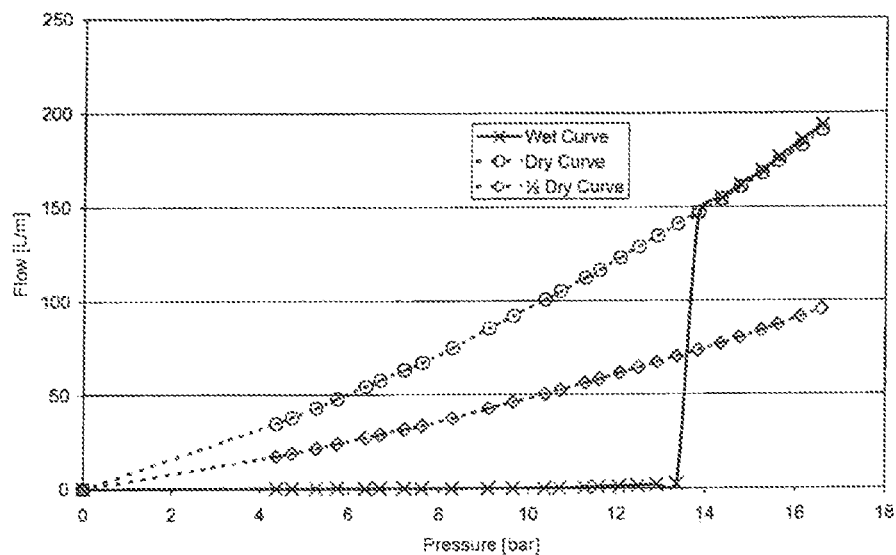
FIG. 6 is a graphical illustration of the dry and wet capillary flows of an inventive filtration membrane.
Figure 7:
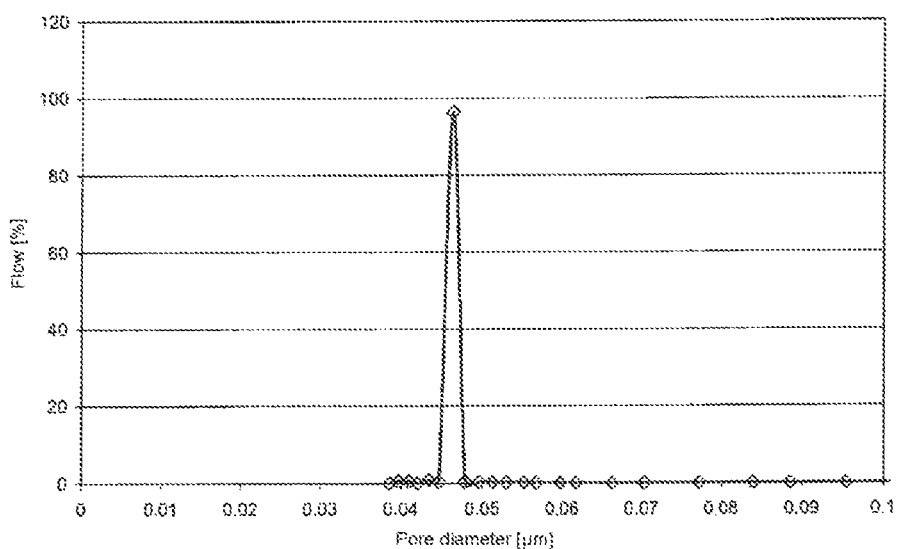
FIG. 7 is a graphical illustration of the pore diameter distribution derived from the measurement curves of FIG. 6.
Figures 8A, 8B:
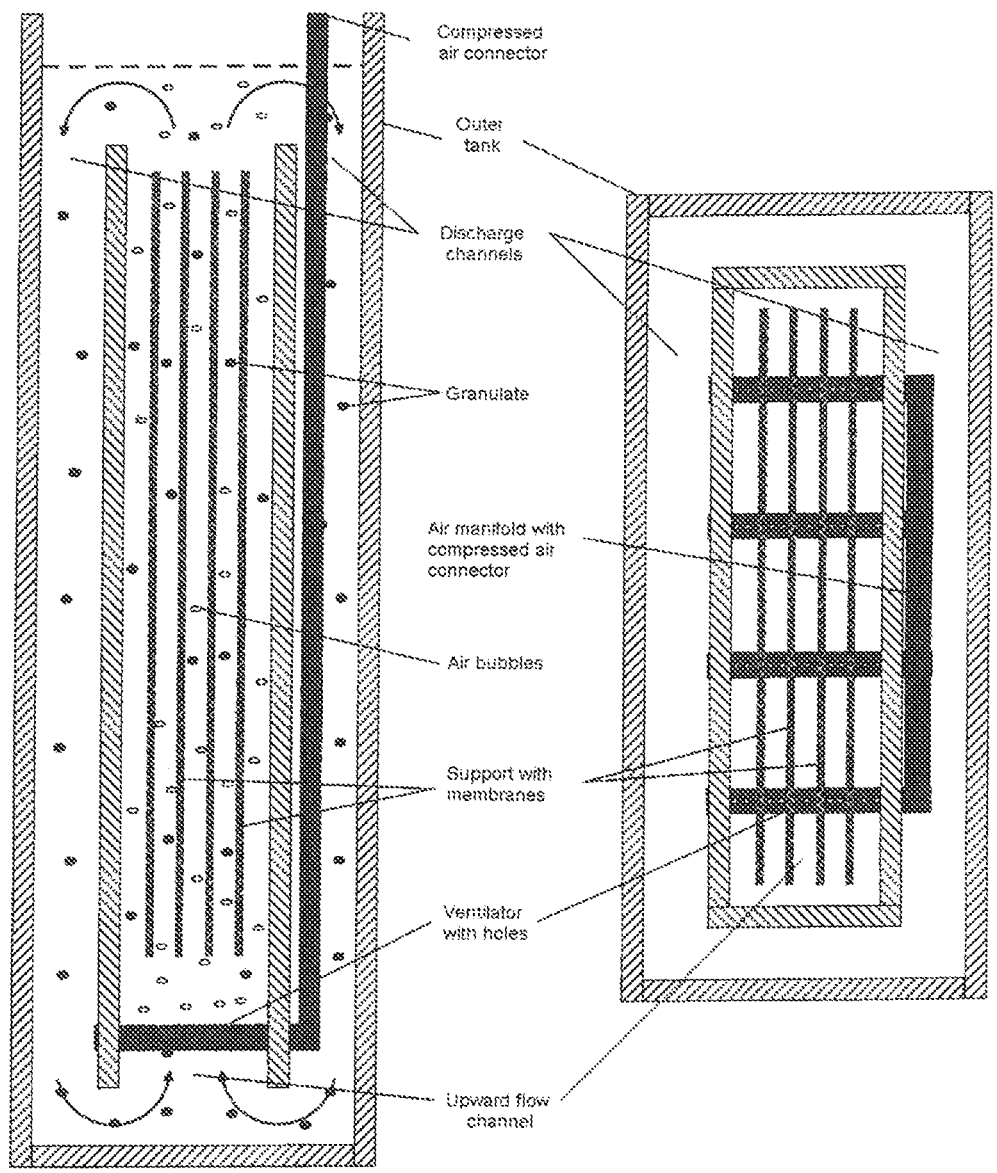
FIGS. 8a and 8b are sectional schematic views of a device for testing abrasion resistance of filtration membranes.

The invention is described in greater detail below with reference to figures. The figures are as follows:

FIG. 1 is a schematic sectional view of a membrane;

FIGS. 2-3 show scan lines on an electron micrograph;

FIG. 4 shows the mean pore size (mean pore opening diameter), determined by means of electron microscopic sectional images, of a membrane according to the invention as a function of distance from the membrane surface;

FIG. 5 shows the mean pore size (mean pore opening diameter) of a membrane of prior art;

FIG. 6 shows measurement curves of the dry and wet capillary flow of a filtration membrane of the invention according to ASTM F 316-03 (2011);

FIG. 7 shows the pore diameter distribution derived from the measurement curves of FIG. 6;

FIGS. 8*a*-8*b* show sectional views of a device for testing abrasion resistance of filtration membranes; and FIG. 9 shows a device for the production of filtration membranes.

In the present application, the filtration membranes according to the invention are described based on parameters that are measured directly or derived from measured values. Here, morphological terms such as number, shape, size, volume, inner surface, and arrangement of pores are not to be taken literally, but are to be understood as the direct or indirect result of a measurement, taking into consideration the models and mathematical methods used to analyze the measurement results.

The filtration membranes according to the invention are characterized in particular by the following four parameters:
mean pore size (or mean pore opening diameter),
mean pore diameter,
clean water permeability, and
abrasion resistance,
which are explained in greater detail in the following.

FIG. 1 shows a schematic sectional view of a filtration membrane 1 according to the invention, comprising a membrane layer (2, 3) with surface 9 and a porous support 9, which is preferably a nonwoven composed of synthetic fibers.

Mean Pore Size (Mean Pore Opening Diameter)

The mean pore size or mean pore opening diameter is determined using membrane microtome sections by screen transmission electron microscopy—referred to in the following as RTEM or STEM—in combination with computerized image analysis. For this purpose, a piece of the filtration membrane to be examined having dimensions within a few centimeters is punched out, cooled with liquid nitrogen, and cut using an ultramicrotome into a thin section sample oriented perpendicular to the membrane surface 9 with a thickness of 400 to 600 nm. The thin section sample is arranged on a copper grid coated with Formvar provided by sputtering with a platinum layer about 5 nm in thickness. The copper grid with the platinum-coated thin section sample is mounted on the sample holder of an RTEM, e.g. the Philips CM 12. The sample chamber of the RTEM is then evacuated to a pressure of about $10^{-6}$ mbar and an image of the thin section sample is captured. A photographic film or the bright field detector of the RTEM is used to capture the image. The beam power of the RTEM and the current intensity of the electron beam in particular are minimized in order to avoid damage to the thin section sample to a large extent.

The surface of the thin section sample imaged by RTEM is rectangular, with a first rectangular side H running perpendicular to the membrane surface 9 and a second rectangular side B running parallel to the membrane surface 9. The lengths of the rectangular sides H and B are at least 10 μm and 30 μm respectively, so that the imaged surface has an area of at least 300 μm².

The maximum lateral resolution of the RTEM is in the range of 0.5 to 1 nm and is largely sufficient to reliably resolve pores with a diameter as small as 10 nm. At a resolution of about 1 nm, the images captured with the RTEM contain at least $3 \times 10^8$ picture elements or pixels, which corresponds to a data volume of 300 MB for a grayscale image with 8 bit color depth or 256 gray levels. If the bright field detector of the RTEM is used to capture the image, the signals or image data during screen scanning of the electron beam are written to a DRAM-based frame buffer and transferred to a hard disk. Alternatively, the image may be captured using photographic film.

The thin section samples include platinum-coated membrane material that is interspersed with pore openings. The electron beam passes through the pore openings unhindered and is detected with maximum intensity, while the platinum-coated membrane material almost completely absorbs the primary electron beam, so that no intensity is detected. For this reason, the image of a thin section sample captured by RTEM is characterized by high contrast. Because of the high RTEM contrast, the gray value histogram of the RTEM images has a bimodal profile with a sharply pronounced minimum $G_{Min}$, wherein dark image areas or pixels with a gray value less than $G_{Min}$ represent membrane material and light pixels with a gray value greater than $G_{Min}$ represent pore openings. In this manner, in image analysis using the gray value minimum $G_{Min}$, each image area or each pixel can be clearly identified as membrane material or a pore opening. The RTEM images of the thin section samples essentially correspond to binary images in which each pixel is either black (gray value 0) or white (gray value 255).

If photographic film is used for capturing the RTEM images rather than the bright field detector, the film negatives or prints produced therefrom are digitized by means of a scanner. A commercially available flat bed or negative scanner with an optical resolution of 4800 dpi or 7200 dpi is used for this purpose.

The digital images obtained by RTEM or the optical photo scan are subjected to computer-aided image analysis that includes the following steps:

Determination of the gray value histogram and determination of the minimum $G_{Min}$, i.e., determination of the gray value with the lowest frequency or the smallest number of pixels with this gray value;

Conversion to a binary image with the previously determined minimum $G_{Min}$ as the threshold, wherein all pixels with a color value less than or equal to $G_{min}$ are assigned the gray value 0 (=black) and all other pixels are assigned the gray value 255 (=white); (in order to reduce the amount of data by ⅛, it is advantageous to represent the gray value with the number or the bit 1);

Line-by-line analysis of the binary image with scan lines running parallel to the membrane surface 9, by the following method:

(i) all pixel values of the scan line are added, with the sum of the pixel values corresponding to the total length of all white line segments (or 255 times the total length if the gray value 'white' is represented by the number 255);

(ii) a copy shifted by one pixel is subtracted from the scan line and the sum of the difference line is calculated, with said sum of the difference line corresponding to the number (or 255 times the number) of the white segments in the scan line;

(iii) the quotient of the sums determined in steps (i) and (ii) is calculated; this quotient represents the mean length of the white segments of the scan line;

Repetition of steps (i) to (iii) for all other scan lines running parallel to the membrane surface 9.

The scan lines of the binary image running parallel to the membrane surface 9 correspond to vectors or n-tuples.

For example, a scan line can be given the gray value shown in FIG. 2, with the first and second white segments having lengths of 6 and 8 respectively. Accordingly, the first and second white segments contribute the summands 6 and 8 to the sum of the scan line calculated according to step (i).

FIG. 3 illustrates step (ii), in which the number of white segments of the scan line is determined, with a copy shifted by one pixel being subtracted from the scan line, with the proviso that the pixel difference "0–1" is assigned the result 0.

The number of white segments of the scan line is then determined from the sum of the pixel values of the difference line.

Steps (i) through (iii) for line-by-line calculation of the mean length of the white segments, i.e., the mean pore size or mean pore diameter, can easily be conducted using software. Using a commercially available PC from Intel or AMD with a multicore microprocessor and 4 GB of internal memory, an RTEM image of a thin section sample with an image file size of 600 MB can be analyzed in under 10 seconds.

The mean pore size or mean pore diameter determined by the above method represents the pore size available for the passage of a liquid flowing through the filtration membrane in the plane of the thin section sample and perpendicular to the membrane surface 9. The mean pore size or mean pore diameter provides insufficient information on three-dimensional pore structure; it constitutes a reduction of the three-dimensional pore morphology to a "two-dimensional" parameter.

FIG. 4 shows the result of an analysis of a thin section sample of a filtration membrane according to the invention. FIG. 5 shows, for comparison purposes, the result of an analysis of a high asymmetric membrane known from prior art.

Mean Pore Diameter

Mean pore diameter depends on the determination method. In the application, this parameter is understood to mean the pore diameter commonly referred to in the English-speaking world as "mean flow pore diameter", which is determined by capillary flow porometry according to the standard ASTM F 316-03 (2011). This mean pore diameter represents the mean value of the equivalent diameter of the narrowest site of all of the pores interspersed in the filtration membrane through which a liquid can flow. Completely closed and impermeable pores that have dead ends are omitted from capillary flow porometry measurements.

The measurements according to ASTM F 316-03 (2011) can be conducted, for example, using capillary flow porometers manufactured by the firms IB-FT, Quantachrome, or Porous Materials Inc.

In the present case, a capillary flow porometer of the type POROLUX™ 1000 manufactured by IB-FT is used. PORE-FIL (surface tension 16 mN/m) from Benelux Scientific is used for wetting the membranes. FIGS. 6 and 7 show the porometry measurement curves of a filtration membrane according to the invention having a mean pore diameter of about 46 nm.

Clean Water Permeability

The clean water permeability of the membranes according to the invention is measured with purified water (PW) at a temperature of 20° C. in a pressure range of 0.1 to 1 bar using conventional centrifugal filter units (e.g. Millipore's AMICON®).

Abrasion Resistance

Abrasion resistance is determined by a specially developed, highly application-oriented test method. This involves a miniature MBR reactor without vacuum extraction of the permeate. The reactor is operated with water and cleaning granules, with this mixture being caused to circulate and act abrasively on the membrane surface by blowing air into the reactor. The specific volume of granules and specific air volume is extremely high compared to actual application in order to accelerate abrasion and obtain conclusive results within a short period.

FIGS. 8*a* and 8*b* show schematic sectional views of the test equipment from a lateral perspective and in plan view. The test equipment includes flat membrane samples that are stretched onto supports 2 mm in thickness, such as PVC sheets. Each of the supports is 21 cm wide and 30 cm high. In order to allow simultaneous testing of multiple samples, four supports are arranged parallel to each other in a housing having a rectangular base surface and an open top and bottom, i.e., arranged with a cross section through with material can freely flow in a vertical direction such that the upper surfaces of the supports or the flat membrane samples stretched onto the supports are vertically oriented. The free gaps or distances between adjacent membranes or supports and between the outer membranes and the wall of the housing are 8 mm respectively. The free gaps form channels for water, air bubbles, and cleaning granules to flow upward. A ventilation system for blowing air in is mounted at a distance of 4 cm below the membranes or the lower edge of the supports. This system consists of 4 copper tubes arranged evenly over the width of the housing having outer diameters of 10 mm. In order to blow in air, holes 0.5 mm in diameter are installed at intervals of 5 mm from one another in the upward flow area, i.e., on the upper side of the copper tubes. The four aeration tubes are connected via a common air manifold and are supplied with compressed air via a connector. The housing with the membranes and the aeration system is completely submerged in a water-filled tank. The tank is dimensioned in such a way that the horizontal distance between the inner walls of the tank and the outer walls of the housing is 20 mm in each case. The free gaps between the inner walls of the tank and the outer walls of the housing form outflow channels in which water and cleaning granules flow downward.

The test equipment is operated with drinking water and cleaning granules composed of polyurethane-based thermoplastic elastomers. The density of the granules is 1.02-1.04 kg/L. The granules have a lenticular (ellipsoid) shape, with a minimum diameter of about 3.5 mm and a maximum diameter of about 5 mm. The reactor is charged with 60 kg of cleaning granules per $m^3$ of water and is larger than in actual application by a factor of approximately 10.

The equipment is operated at a total air flow rate of 6 $m^3$/h. The ratio of the air volume to the entire cross-sectional area it flows over is also referred to as superficial velocity, and it is approx. 0.18 m/s and is therefore greater than in actual application by a factor of 4. Because of the high air volume, water is discharged. A constant water level is maintained by constant addition and overflow of water.

The equipment is operated continuously for 450 h under the above-mentioned conditions. The membrane samples are then removed and characterized according to the above-described methods (clean water permeability, mean pore diameter).

FIG. 9 shows a device 100 for the production of filtration membranes according to the second production method of the invention. The device 100 includes a plurality of rollers 141, 142, 143, 144, and 145 for the supply or unwinding, transport and winding of a porous support in sheet form 4. The unwinding, transport, and winding of the support 4 are indicated by arrows 146. The rate at which the support is transported is 1 to 120 m/min, and preferably 4 to 30 m/min. By means of a known spraying device, a gravure roll, or a pouring device 150, a polymer solution is applied to the support 4 and molded by means of a doctor blade 151 into a layer of essentially constant thickness. It is advantageous to install, underneath the spraying device, gravure roll or pouring device 150 and the doctor blade 151, an essentially planar and smooth bearing 152 over which the support 4 slides. The thickness of the layer of polymer solution applied to the support 4 is adjusted in a known manner via the gap and/or the force with which the doctor blade 151 is pressed against the bearing 152.

After application of the polymer solution, the support coated with polymer solution 4 is fed via an air gap A into a first precipitation bath 160. The length of the line L running from the support 4 in the first precipitation bath 160 is 0.4 to 2.0 m. The first precipitation bath 160 is provided in a channel 161 having a small volume. The channel 161 is configured in the form of a flat tube of rectangular cross section and is bounded by two walls 162 and 163 in the drawing plane of FIG. 9. The distance or clearance between the walls 162 and 163 is 5 to 50 mm, and preferably 5 to 20 mm, in order to keep the volume of the first precipitation bath as low as possible. The walls 162 and 163 are inclined with respect to the vertical, i.e., at an angle α with $10° \leq \alpha \leq 80°$, and preferably $20° \leq \alpha \leq 70°$ in the drawing plane of FIG. 9.

The channel 161 is provided with one or more supply lines 164, 165, 166 and at least one discharge line 167. The supply lines 164, 165 and 166 are preferably arranged along line L at a constant distance D from each other. Each of the supply lines 164, 165, 166 is connected to a precipitation liquid storage tank, not shown in FIG. 9, with the concentration of solvent in the precipitation liquid decreasing along line L in the transport direction of the support 4. Preferably, the supply lines 164, 165, 166 are equipped with electronically controlled valves, not shown in FIG. 9, which make it possible to control the volume of precipitation liquid supplied from the respective storage tank to the channel 161 per unit time with a preset concentration of solvent.

In an advantageous embodiment of the device 100, one or more electrochemical or spectroscopic in-line sensors are also arranged inside the channel 160, said sensors being used to measure the concentration of solvent in the first precipitation bath along line L and send the corresponding measured values as input signals to a programmable logic controller (PLC). In this type of embodiment of the device according to the invention 100, the electronically controllable valves in the supply lines 164, 165, 166 are connected to the programmable logic controller so as to provide a control circuit for adjusting the solvent concentration in the first precipitation bath 160.

The minimum of one discharge line 167 is advantageously arranged at the end of line L or close to the lowest point of the channel 161 and connected to a collecting tank not shown in FIG. 9 and optionally to a device for solvent recovery or treatment and recirculation of the first precipitation bath 160. In an advantageous embodiment of the device 100, the discharge line 167 is connected to a suction pump, which creates a slight vacuum at the end of line L and reduces fluid transfer from the first precipitation bath 160 to a subsequent second precipitation bath 180.

The channel 161 is connected to a second precipitation bath 180 which is kept in a container 181. The first precipitation bath 160 is in fluid communication with the second precipitation bath 180 via an opening 182. The support 4 coated with the polymer solution is fed through the opening 182. The opening 182 is dimensioned such that the distance between the support 4 and the edge bordering the opening 182 is 3 to 15 mm, preferably 3 to 10 mm, and more preferably 3 to 8 mm, and such that fluid transfer from the first precipitation bath 160 to the second precipitation bath 180 is minimized.

After leaving the second precipitation bath 180, the support 4 with the membrane layer created by precipitation of the polymer solution is optionally fed through a dryer and/or impregnation device not shown in FIG. 9 and wound onto the roller 145.

The invention claimed is:

1. A filtration membrane comprising a porous support, a membrane surface for receiving feed, and a membrane layer with a first and second zone, wherein the first zone has a thickness of 5 to 15 µm and a mean pore size of less than or equal to 0.4 µm and the second zone has a thickness of 5 to 40 µm and a mean pore size of 0.4 to 5.0 µm and wherein, said support is a textile nonwoven, wherein the filtration membrane has a clean water permeability of 200 to 2000 L/(m$^2$·h·bar).

2. The filtration membrane as claimed in claim 1, wherein the first zone has a thickness of 8 to 12 µm.

3. The filtration membrane as claimed in claim 1, wherein the first zone has a mean pore size of less than or equal to 0.3 µm.

4. The filtration membrane as claimed in claim 1, wherein the second zone has a thickness of 5 to 30 µm.

5. The filtration membrane as claimed in claim 1, wherein the second zone has a mean pore size of 0.4 to 2.0 µm.

6. The filtration membrane as claimed in claim 1, wherein in the first zone the mean pore size increases with increasing distance from said membrane surface and said first zone is placed next to said membrane surface.

7. The filtration membrane as claimed in claim 6, wherein in the second zone, the mean pore size increases with increasing distance from said membrane surface.

8. The filtration membrane as claimed in claim 6, wherein the second zone is comprised of polysulfone and polyvinylpyrrolidone.

9. The filtration membrane as claimed in claim 1, wherein said filtration membrane has, after an abrasion test lasting 450 h, a mean pore diameter of 0.05 to 0.2 µm.

10. A filtration device comprising a filtration membrane as claimed in claim 1.

11. The filtration membrane as claimed in claim 1, wherein the filtration membrane has a clean water permeability of 300 to 2000 L/(m$^2$·h·bar).

12. The filtration membrane as claimed in claim 1, wherein the filtration membrane has a clean water permeability of 500 to 1000 L/(m$^2$·h·bar).

13. The filtration membrane as claimed in claim 4, wherein the second zone has a thickness of 10 to 20 µm.

14. The filtration membrane as claimed in claim 9, wherein said filtration membrane has, after an abrasion test lasting 450 h, a mean pore diameter of 0.08 to 0.15 µm.

15. The filtration membrane as claimed in claim 7, wherein said second zone is placed between said first zone on one side and said porous support on the side opposite said first zone such that the porous support is placed away from said membrane surface.

16. A flat filtration membrane comprising a nonwoven porous support and a membrane layer with a first and second zone and a membrane surface for receiving feed;
   wherein the first zone is placed next to said membrane surface and said second zone is placed between said first zone on one side and said nonwoven porous support on the side opposite said first zone such that said nonwoven porous support is placed away from said membrane surface; and
   wherein in the first zone, the mean pore size increases with a mean gradient of 20 to 80 nm per 1 µm distance from said membrane surface and in the second zone, the mean pore size increases with increasing distance from said membrane surface; and
   wherein the first zone has a thickness of 5 to 15 µm and a mean pore size of less than or equal to 0.4 µm and the second zone has a thickness of 5 to 40 µm and a mean pore size of 0.4 to 5.0 µm; and
   wherein the first zone and the second zone are comprised of polysulfone and polyvinylpyrrolidone, and the filtration membrane has a clean water permeability of 200 to 3000 L/(m$^2$·h·bar).

17. The filtration membrane as claimed in claim 1, wherein the filtration membrane is flat, the membrane surface for receiving feed is comprised within the first zone, the nonwoven is a mechanical stabilizer and said membrane comprises polyvinylpyrrolidone.

18. The filtration membrane as claimed in claim 1, wherein the filtration membrane is flat, the membrane surface for receiving feed is comprised within the first zone and in the first zone the mean pore size increases with a mean gradient of 20 to 80 nm per 1 µm distance from said membrane surface and in the second zone and the mean particle size increases with a mean gradient of 200 to 800 nm per 1 µm distance from said membrane surface, the mean pore size increasing with increasing distance from said membrane surface; and said membrane comprised of a single polymer layer.

* * * * *